United States Patent [19]

Shifrin et al.

[11] Patent Number: 4,624,566
[45] Date of Patent: Nov. 25, 1986

[54] SPECTRAL ANALYZER AND DIRECTION INDICATOR

[75] Inventors: Gordon A. Shifrin, Malibu; Jerome M. Welner, Manhattan Beach, both of Calif.

[73] Assignee: Hughes Aircraft Company, Los Angeles, Calif.

[21] Appl. No.: 722,973

[22] Filed: Apr. 12, 1985

[51] Int. Cl.$^4$ .......................... G01J 3/28; H01J 40/14
[52] U.S. Cl. ........................ 356/326; 250/578
[58] Field of Search ................. 250/200, 216, 578; 356/326

[56] References Cited

U.S. PATENT DOCUMENTS

| | | | |
|---|---|---|---|
| 3,824,018 | 7/1974 | Crane, Jr. | 356/352 |
| 4,147,424 | 4/1979 | Foster et al. | 356/352 |
| 4,170,416 | 10/1979 | Fencil | 356/352 X |
| 4,183,669 | 1/1980 | Doyle | 356/346 |
| 4,185,919 | 1/1980 | Williamson | 350/3.72 X |
| 4,309,108 | 1/1982 | Seibert | 356/352 |

Primary Examiner—Eugene R. Laroche
Assistant Examiner—D. C. Mis
Attorney, Agent, or Firm—Lewis B. Sternfels; A. W. Karambelas

[57] ABSTRACT

A spectral analyzer and direction indicator system (10) is disclosed and includes first and second optical channels (20,30) for providing detected optical information indicative of incidence direction and spectral content of incident radiation. The first optical channel includes a reflector element (11) having a non-ruled section (11a) and a spectrally dispersing ruled section (11b); an analytical optical system (13); and a detector array (15). In the reflector element of the first optical channel the non-ruled section is tilted relative to the ruled section. The second optical channel includes a non-dispersing reflector element (17), an analytical optical system (19), and a detector array (21).

10 Claims, 3 Drawing Figures

DIFFRACTED SPOT

NON-DIFFRACTED SPOT

SPECTRAL ANALYZER AND DIRECTION INDICATOR

BACKGROUND OF THE INVENTION

1. Field of the Invention

The disclosed invention generally relates to apparatus for detecting essentially collimated radiation, measuring wavelength values within that radiation, determining the direction to the source of that radiation within an extended field-of-view, and observing the coherence length of sources so as to discriminate between essentially coherent (e.g., laser) and non-coherent radiation, all of which is accomplished simultaneously and in staring fashion (i.e., without scanning).

2. Background Art

The prior art includes a variety of devices for detecting coherent radiation. Examples of such prior art devices are discussed below.

U.S. Pat. No. 3,824,018, issued to Crane, Jr., discloses an unequal path interferometer. The interferometer scans so as to cause a change in the difference in the two optical paths which will modulate the intensity of the recombined coherent radiation by varying interference effects.

U.S. Pat. No. 4,147,424, issued to Foster, et al., discloses a system for detecting the presence of coherent radiation having an interference filter with a pair of partially reflective mirrors, with the spacing between the mirrors being varied sinusoidally to change the transmission wavelength of the mirrors. The output is compared to an established reference signal to produce an identifying indication of the detected radiation.

U.S. Pat. No. 4,170,416 discloses apparatus for detecting the presence of coherent radiation in the presence of incoherent ambient radiation, and for determining the intensity, the wavelength, or the threshold direction of such coherent radiation. The apparatus includes a Fabry Perot etalon having three regions of different thickness.

U.S. Pat. No. 4,183,669, issued to Doyle, and U.S. Pat. No. 4,185,919, issued to Williamson et al., disclose a quadrant detection system using an objective lens and a holographic lens. The holographic lens has lens elements in four quadrants with each quadrant having a focal point corresponding to the position of adjacent photoelectric detectors.

U.S. Pat. No. 3,858,201, issued to Foster, discloses a system for determining a direction from which an illuminating laser beam is received. The system includes a cylindrical optical system for focusing a laser beam as a sharp line image.

U.S. Pat. No. 4,309,108, issued to Siebert, discloses an analyzer for coherent radiation for discriminating wavelength from a single pulse or from a continuous wave radiation and to determine the relative angular position of the source of the radiation. The analyzer includes at least three unequal length path interferometers and detectors for detecting the radiation transmitted through the interferometers.

The foregoing prior art devices are generally complex, relying to a large extent on classical electrooptical techniques and/or the use of scanning.

While the prior art devices exhibit various combinations of features for measuring characteristics of radiation, none, however, has the versatility or all of the particular and extensive features of the disclosed invention combined into a single instrument without the need to scan.

SUMMARY OF THE INVENTION

It is, therefore, an object of this invention to provide a spectral analyzer and direction indicator that without resorting to scanning detects essentially collimated radiation, and with respect to that radiation, simultaneously measures quantities that uniquely determine (1) its wavelength values within an extended spectral band, (2) its direction within an extended field-of-view, and (3) its coherence length so as to discriminate between radiation that is coherent or essentially coherent and non-coherent. The principle of operation for the disclosed invention applies equally well in any spectral region (e.g., from ultraviolet to microwave) for which there exist suitable dispersive and detecting elements.

It is also an object of the present invention to provide an efficient spectral analyzer and direction indicator responsive to essentially collimated radiation.

Another object of the invention is to provide a rugged and versatile spectral analyzer and direction indicator responsive to essentially collimated radiation.

Still another object of the invention is to provide a spectral analyzer and direction indicator responsive to radiation that is either essentially coherent (e.g., laser) or non-coherent.

A further object of the invention is to provide a non-scanning spectral analyzer and direction indicator that detects essentially collimated radiation, discriminates between radiation that is essentially coherent (e.g. laser) and non-coherent (i.e., spectrally broad), and that locates the direction within a specified but extended field-of-view from which that radiation is received.

An additional object of this invention is to provide a staring spectral analyzer and direction indicator that measures wavelength values contained within the detected radiation, which can be either coherent or non-coherent, and that can occur anywhere within a specified but extended spectral interval.

Still a further object of the invention is to provide a spectral analyzer and direction indicator responsive to collimated or essentially collimated radiation and capable of discriminating a plurality of sources.

A still further object of the invention is to provide a spectral analyzer and direction indicator that is rugged enough to be readily utilized in vehicles.

Another object of the invention is to provide a spectral analyzer and direction indicator which has reduced internal field of view requirements.

Still another object of the invention is to provide a spectral analyzer and direction indicator which has reduced complexity.

The foregoing and other objects of the invention are accomplished in a spectral analyzer and direction indicator system which includes an optical channel having a sectioned reflective element with two separate sections for respectively providing diffracted and non-diffracted optical information, an analytical optical system for appropriately focusing the optical information, and detector apparatus for detecting the optical information. The detected information provided by such channel is utilized to determine spectral content and a first angular incidence direction of incident radiation. The spectral analyzer and direction indicator system further includes a non-dispersing optical channel having a reflector element for providing non-diffracted optical information, an analytical optical system, and detector apparatus for detecting the optical information. The detected information is utilized to determine second angular incidence direction of incident radiation.

Sections of the sectioned reflector element are angled or tilted relative to each other so as to intersect along a first line. Such tilting reduces the internal field of view without introducing ambiguity of the images. The images are colinear and will always lie along a straight line perpendicular to the lengthwise orientation of the elements in the detector array.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION

Figure 1:
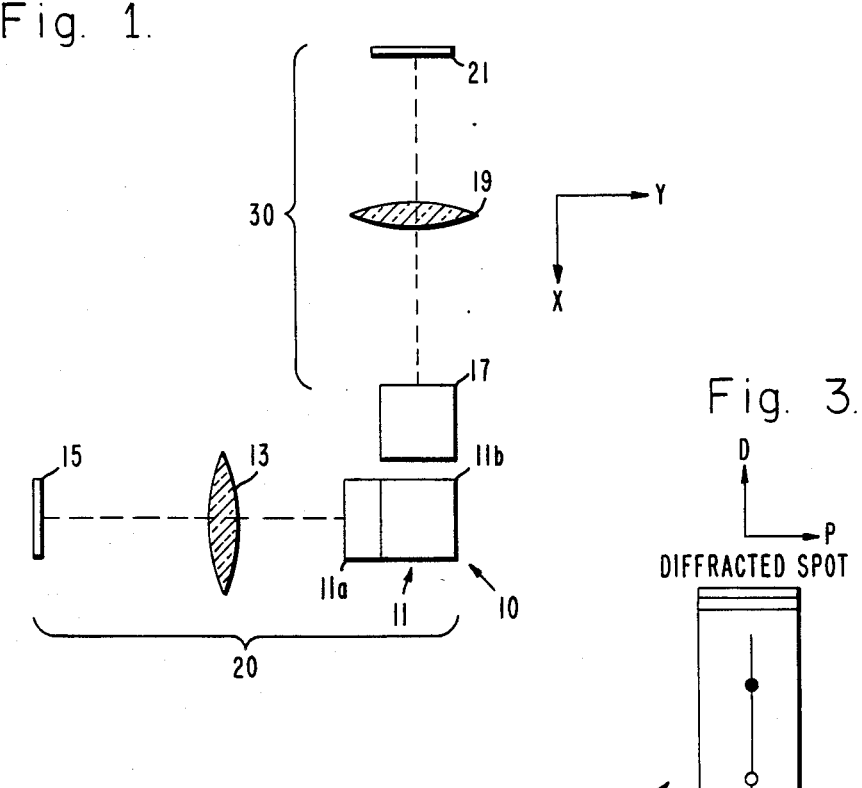
FIG. 1 is a top plan schematic view illustrating the disclosed spectral analyzer and direction indicator system.

In the following detailed description and in the several figures of the drawing, like elements are identified with like reference numerals.

While the disclosed invention is useful with different kinds of essentially collimated radiation (e.g., from ultraviolet to microwave), the disclosed system will be described primarily relative to wavelengths typical of visible and infrared radiation. This will facilitate the understanding of the principles involved which can then be applied to other sources of radiation.

For reference purposes, the following spectral analyzer and direction indicator system discussed relative to a three dimensional right-handed Cartesian coordinate system and directional angles measured relative to the Cartesian coordinate system. In FIG. 1, which is a top plan view, the x and y axes are shown while the z-axis is understood to be orthogonal to the x and y axes and having a positive direction out of the plane of the figure. In the elevational view of FIG. 2, the y and z axes are shown, while the x-axis is understood to be orthogonal. In the perspective view of FIG. 4, the x, y and z axes are shown.

Figure 2:
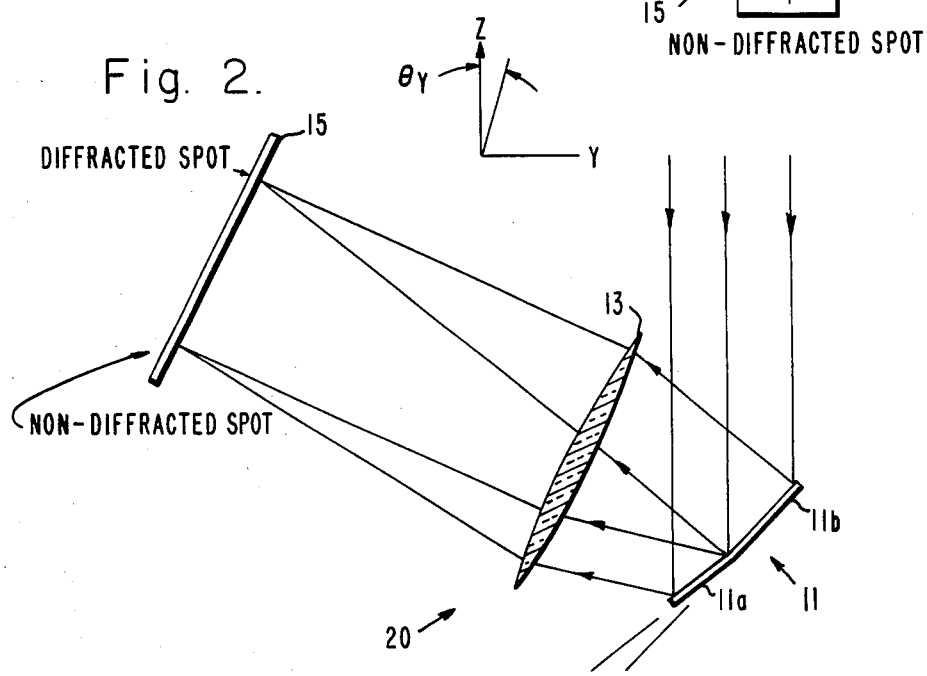
FIG. 2 is an elevational schematic view illustrating an optical channel of the disclosed spectral analyzer and direction indicator system of FIG. 1.

As references for incidence direction, the angles $\theta x$ and $\theta y$ are provided, whereby $\theta x$ is measured in the xz plane relative to the z-axis and $\theta y$ is measured in the yz plane relative to the z-axis. FIG. 2 illustrates the measurement of $\theta y$ relative to the z-axis.

The z-axis can be considered as being along the center line (line of sight) of the external field of view (FOV), which refers to the field of view over which a spectral analyzer and direction indicator can receive incident radiation. In other words, external FOV refers to the section of space which a spectral analyzer and direction indicator can observe. Internal field of view (FOV) in the disclosure generally refers to the field of view of one or more of the optical components within a spectral analyzer and direction indicator. Such optical components include reflectors, lenses, and detector arrays.

The spectral analyzer and direction indicator system 10 shown in the top plan view of FIG. 1 includes a first reflector element 11 having a non-ruled section 11a and a ruled section 11b, wherein the rulings are parallel to the x-axis. Each of the sections is a reflecting element, wherein one section is ruled. An analytical optical system 13, shown as a simple lens, focuses the reflected radiation on to a linear detector array 15. The detector array 15 has parallel elongated detector elements which are parallel to the x-axis. As will be discussed more fully below, the position of the undiffracted reflected image on the detector array 15 relative to the direction perpendicular to the lengthwise orientation of the elements is indicative of the $\theta y$ direction of the incident radiation, as well as the angle of incidence relative to the ruled reflector section 11b. The position of the diffracted image detected by the detector array 15 relative to the direction perpeindicular to the lenghtwise orientation of the elements is indicative of the angle of diffraction resulting from the ruled reflector section 11b. The reflector element 11, the analytical optical system 13, and the detector array 15 will be referred to as an optical channel 20.

The spectral analyzer and direction indicator 10 further includes a second reflector element 17 which is smooth and non-ruled. By way of example, the reflector element 17 is a planar mirror. A second analytical system 19, shown as a simple lens, focuses the reflected radiation on to a linear detector array 21. The detector array 21 has parallel elongated detector elements which are parallel to the y-axis. The position of the undiffracted image detected by the detector array 21 relative to the direction perpendicular to the lengthwise orientation of the elements is indicative of the $\theta x$ direction of the incident radiation. The reflector element 17, the associated analytical optical system 19, and the detector array 21 are referred to herein as a non-dispersing optical channel 30.

As indicated in FIG. 1, the optical channels are at right angles to each other. Such orientation allows for a staightforward determination of the incidence direction angles $\theta x$ and $\theta y$.

Referring to the elevational view of FIG. 2, shown therein is the optical channel 20. As shown, the reflector sections 11a and 11b are planar and are angled relative to each other so that their respective planes intersect along a line parallel to the x-axis and parallel to the rulings on the ruled reflector section 11b. As measured from the incident surfaces of the reflector sections 11a and 11b, the angle formed is less than 180 degrees. The angled relationship between the reflector sections 11a and 11b results in reduced internal FOV requirements in the direction of change in $\theta y$ and in the direction of diffraction by the ruled section 11b. FIG. 2 also shows typical locations for the diffracted and non-diffracted spots produced by an essentially collimated incident beam.

The optical channel 30, including the reflector 17, the analytical optical system 19, and the detector array 21, provides only non-dispersed reflected radiation. Therefore, the internal FOV requirement for the optical channel 30 is less than that for the optical channel 20.

Figure 3:
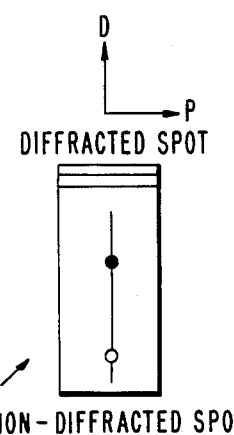
FIG. 3 is a schematic of a detector array as utilized in the spectral analyzer and direction indicator of FIG. 1, and illustrates relative locations of the optical information focused on such detector array.

Referring now to FIG. 3, shown therein is a schematic of the incident side of the detector array 15 shown in FIGS. 1 and 2. The D axis identifies the direction of diffraction caused by the ruled reflector section 11b. The D axis also identifies the direction of change relative to changes in the incidence direction $\theta y$.

The detector array 21 is similar to the detector array 15. The elongated detector elements of the detector array 15 are oriented parallel to the y-axis. The detector array 21 detects position in the direction of change in the incidence direction θx.

As is well known, the ruled reflector section 11b will reflect incident radiation at angles which depend on spectral content. The following will describe the determination of spectral content for information from the ruled reflector section 11b.

Rays for both incidence angle I and diffraction angle D are measured relative to the normal to the ruled reflector section 11b. The convention for both of these angles is that rays on opposite sides of the normal have opposite algebraic signs. The grating equation below relates one component of the angle of incidence (the component normal to the rulings) to the angle of diffraction:

$$\sin D = (nW/d) - \sin I \quad \text{(Equation 1)}$$

The symbols represent the following values:

TABLE I

I: angle of incidence
D: angle of diffraction
W: wavelength
n: order of diffraction
d: spacing of adjacent rulings on ruled reflector section Solving Equation 1 for wavelength W provides the following:

$$W = d/n[\sin D + \sin I] \quad \text{(Equation 2)}$$

The wavelengths of the spectral component of the incident radiation are, therefore, functions of the detector positions of both the non-diffracted and diffracted images. The location of the diffracted image actually is a function of both the θx and θy components of the angle of incidence. However, since the elements on the detector array 15 are elongated ar right angles to the displacements produced by θy, only the θy component of the incidence direction is detected, assuming that elements of the array are not segmented.

The nature of the diffracted image on the linear detector array 15 will depend on the nature of the incident radiation. When the incident light is collimated, the diffracted light will also be collimated. For a spectrally narrow source, such as a laser, a focused spot is produced on the detector array 15. The location of the focused spot on the detector array spot provides a measure of the angle of diffraction D.

For a point source that is spectrally broad, the diffracted image on the detector array 15 will not be a single focused spot but will be an image that occupies an angular interval along the array whose extent is determined by both the spectral content of the source and any spectral filters that might be introduced. Each illuminated detector element corresponds to an angle of diffraction from the associated grating and detector element output level represents the amplitude of a portion of the spectrum. Thus, both the spectral signature of the point source and its angular position within the FOV can be determined when the information provided by the illuminated detector elements is suitably interpreted.

An expression for coherence length L is:

$$L = W^2/(\pi \Delta W) \quad \text{(Equation 3)}$$

where ΔW is the spectral bandwidth in the radiation. Since the spectral analyzer and direction indicator can yield values for both wavelength and spectral bandwidth, coherence length can be obtained from measured quantities to within an upper limit set by the spectral resolution of any particular instrument.

The location of the undiffracted image on the detector array 15 actually is a function of both θx and θy. Because the elements of the array 15 are elongated at right angles to the displacement produced by θy, however, only the θy component of the incidence direction is resolved, assuming that elements of the array are not segmented. Therefore, the detected location of the undiffracted image provides information as to the angle of incidence I, since the smooth reflector portion 11a remains at a known fixed angle relative to the ruled reflector section 11b.

The detected locations on the detector array 15 of the non-diffracted and diffracted images are appropriately processed for determining wavelength W in accordance with Equation 2.

Referring now to the optical channel 30, the location of the detected non-diffracted image on the detector array 21 is indicative of the incidence direction θx.

The performance of the reflector sections 11a and 11b of the optical channel 20 can best be understood with reference to the images it focuses on to the detector array 15. Shown in FIG. 3 are two spots corresponding to the non-diffracted and diffracted images of a laser source observed by the optical channel 20. The two spots define a line which is parallel to the D axis which identifies the direction of diffraction. For all such observed sources, the two spots will always form a line parallel to the D axis. For a given included angle between the reflector sections 11a and 11b, the distance separating the spots will be a function of both wavelength and the incidence direction θy. For a fixed wavelength and a fixed incidence direction, the two spots will move closer to each other as the included angle between the reflector sections 11a and 11b is reduced from 180 degrees. Thus, the integral FOV along the D axis is reduced as the includes angle is reduced from 180 degrees. However, in order to avoid confusion, the included angle between the reflector sections 11a and 11b is appropriately determined so that the two spots will always be separately detectable for the spectral range of interest and all directions within the external FOV. Specifically, the distance between the non-diffracted and diffracted spots must always be at least three detector elements along the D axis.

Although the foregoing has been a description and illustration of specific embodiments of the invention, various modifications and changes thereto can be made by persons skilled in the art without departing from the scope and spirit of the invention as defined by the following claims.

What is claimed is:

1. A spectral analyzer and direction indicator system for receiving collimated or essentially collimated incident radiation comprising:

first optical means responsive to the collimated or essentially collimated incident radiation for providing first non-dispersed optical information indicative of incidence direction and spectrally dispersed optical information;

first detector means responsive to said first non-dispersed optical information and to said dispersed optical information for providing detected information for identifying as to the collimated or essentially collimated incident radiation a first angular incidence direction and the spectral content;

second optical means responsive to the collimated or essentially collimated incident radiation for providing only second non-dispersed optical information indicative of incidence direction of the incident radiation; and second detector means responsive to said second non-dispersed optical information for providing detected information for identifying as to the collimated or essentially collimated incident radiation a second angular incidence direction.

2. The spectral analyzer and direction indicator of claim 1 wherein said first optical means comprises a reflector having a ruled planar section and a smooth non-ruled planar section tilted relative to said ruled planar section, and wherein said second reflective optical means comprises a smooth non-ruled planar reflector.

3. The spectral analyzer and direction indicator of claim 2 wherein said smooth non-ruled planar section of said first optical means reflector is tilted about an axis parallel to the rulings on said ruled planar section.

4. The spectral analyzer and direction indicator of claim 1 wherein said first optical means and said first detector means comprise a first optical channel, and wherein said second reflective optical means and said second detector means comprise a second optical channel, said first and second optical channels being at right angles.

5. A spectral analyzer and direction indicator for receiving collimated or essentially collimated incident radiation comprising:

a first optical channel responsive to the collimated or essentially collimated incident radiation for providing detected information for identifying as to the collimated or essentially collimated incident radiation a first angular incidence direction and the spectral content; and a second optical channel responsive to the collimated or essentially collimated incident radiation for providing detected information for identifying as to the collimated or essentially collimated incident radiation a second angular incidence direction.

6. The spectral analyzer and direction indicator of claim 5 wherein said first optical channel provides first non-dispersed optical information and dispersed optical information, and wherein said second optical channel provides second non-dispersed optical information.

7. The spectral analyzer and direction indicator of claim 6 wherein said first optical channel includes a reflector having a ruled planar section and a smooth non-ruled planar section which is tilted relative to said ruled planar section, and wherein said second optical channel includes a smooth non-ruled planar reflector.

8. A spectral analyzer and direction indicator system for receiving collimated or essentiallly collimated incident radiation comprising:

first optical means responsive to the collimated or essentially collimated incident radiation for providing radiation containing first non-dispersed optical information and dispersed optical information;

first analytical optical means for focusing said radiation containing said first non-dispersed optical information and said dispersed optical information;

second optical means responsive to the collimated or essentiallly collimated incident radiation for providing radiation containing only second non-dispersed optical information;

second analytical optical means for focusing said radiation containing said second non-dispersed optical information; and detection means responsive to said radiation focused by said first and second analytical optical means for providing as to the collimated or essentially collimated incident radiation detected information indicative of the spectral content and the incidence direction.

9. The spectral analyzer and direction indicator system of claim 8 wherein said first optical means comprises a reflector having a ruled planar section and a smooth non-ruled planar section tilted relative to said ruled planar section, and wherein said second optical means comprises a smooth non-ruled planar reflector.

10. The spectral analyzer and direction indicator system of claim 9 wherein said detection means comprises:

a first detector array responsive to said first non-dispersed optical information and to said dispersed optical information; and a second detector array responsive to said second non-dispersed optical information.

* * * * *